July 24, 1928.                                                          1,678,459
                            A. BOWLAND
                      VALVE FOR FLUID FUEL BURNERS
                         Filed Feb. 21, 1927
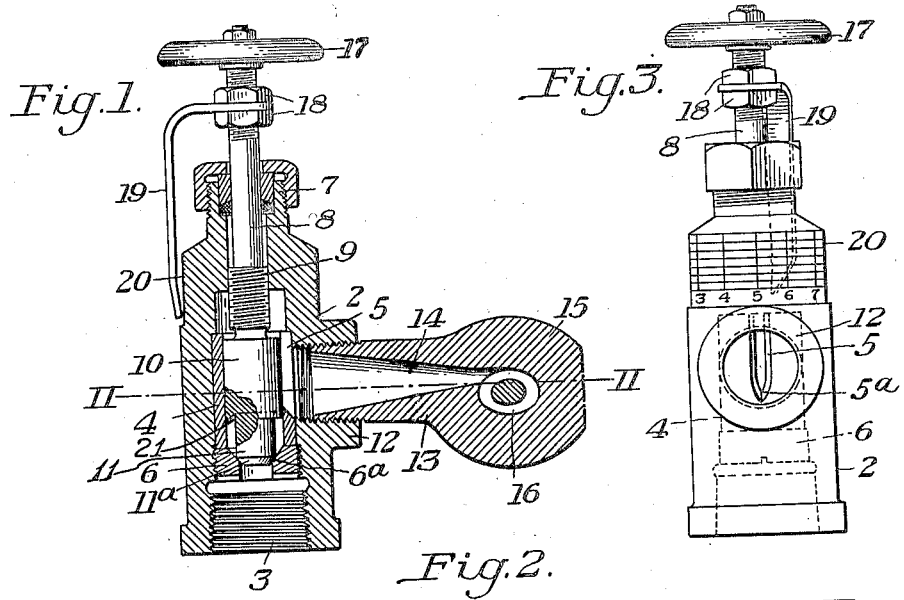
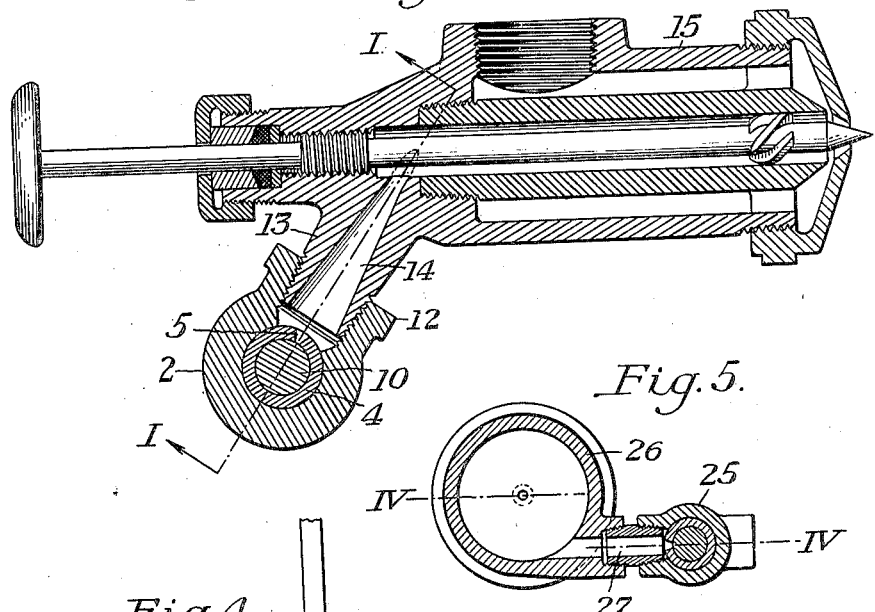
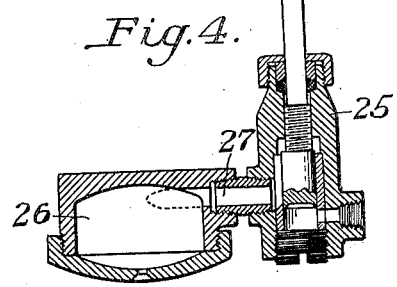
INVENTOR
Andreas Bowland
by his attorneys
Byrnes, Stebbins & Parmelee Patented July 24, 1928.

1,678,459

UNITED STATES PATENT OFFICE.

ANDREAS BOWLAND, OF WILKINSBURG, PENNSYLVANIA.

VALVE FOR FLUID-FUEL BURNERS.

Application filed February 21, 1927. Serial No. 169,814.

This invention is for a valve especially adapted for use in connection with fuel burners, and more particularly fuel burners for burning heavy oils and tar.

A valve for this purpose must be capable of providing very fine increments of adjustment so that a very exact regulation of the flow of fuel can be secured. At the same time, it must be so constructed that it will not easily become clogged. Furthermore, the valve should be so arranged in conjunction with the burner that the velocity of the fluid stream will not be checked immediately after the fuel has left the valve, whereby the building-up of back pressures in the valve is avoided.

According to the present invention, there is provided a valve which can be manufactured much more cheaply than present types of valves applicable for this purpose, and which can be very exactly regulated. The nature of the invention may be readily understood by reference to the accompanying drawings in which:

Figure 1 is a vertical section through a valve of a burner;

Figure 2 is a horizontal section in the plane of line II—II of Figure 1;

Figure 3 is a front elevation of the valve with the burner detached; and

Figures 4 and 5 are views corresponding generally to Figures 1 and 2 respectively, of a modification showing the valve on a smaller scale, applied to a slightly different type of burner.

The valve comprises a body 2 interiorly threaded at its open end 3 so as to permit a fluid supply pipe to be connected thereto. Fitted into the hollow interior of the valve body is a cylindrical sleeve 4, having a vertical slot 5 cut therein and extending throughout a portion of the length of the sleeve. The slot 5 is preferably cut into the sleeve by a milling cutter in such manner that the walls of the slot are outwardly divergent while the inner end of the slot tapers to a point, as indicated at 5ª. Due to the fact that the slot is cut with a milling tool, the tapered portion is slightly arcuate as shown. The sleeve is retained in the body by means of a disk 6 screwed into the open end thereof. This disk has a central orifice therein and a valve seat surrounding the orifice on the inner side of the disk at 6ª.

At the top of the body 2 of the valve is a gland 7 through which passes a valve stem 8 threaded into the valve body at 9 and having a plug 10 thereon below the thread 9 and in the chamber within the sleeve 4. The plug portion 10 has a working fit inside the sleeve. Projecting below the plug 10 is an extension 11 with a tapered end portion 11ª adapted to cooperate with the valve seat 6ª on the disk 6 when the valve is closed. When the valve is closed the end portion 11ª fits tightly against the valve seat 6ª to tightly close the valve. At this time the plug 10, which is substantially coextensive with the length of the slot 5, covers the slot and also entirely closes the valve. In the valve body in line with the slot 5 is an interiorly threaded boss 12 into which a nipple 13 on the burner is screwed. The nipple 13 has an interior passage 14 therein which is inwardly tapered toward the burner 15 and which is tangential to the fuel passage 16 inside the burner. The outer end of the fuel passage 14 opposite the slot 5 is of such diameter that it offers little or no obstruction to the flow of fluid through the slot. By reason of the conical shape of this passage, as clearly shown in Figures 1 and 2, the velocity of the flow of fluid is maintained so that no back pressure of fluid against the outside of the slot 5 exists.

Carried on the valve stem 8 is an operating means, such as the usual type of hand wheel 17. Adjustably secured on the stem 8 below the hand wheel between nuts 18 is a pointer 19 that is bent downwardly against the upper portion of the valve body 2. This upper portion of the valve body, as indicated at 20, is graduated around the valve into suitable divisions, preferably ten. This stem portion of the valve body is also graduated horizontally into lines corresponding substantially to the pitch of the threads at 9. With this arrangement the exact extent of the movement of the valve can be definitely controlled and the degree of opening always ascertained. With the graduation as illustrated, the position of the valve can be determined to each tenth of the pitch of the thread.

In its operation, fluid is supplied to the valve through the pipe connected to the body at 3. This fluid, in most installations, would be supplied under pressure. When the valve is fully closed the plug 10 covers the valve slot 5 and the extension 11 cooperates with the disk 6 to additionally close the valve to prevent leakage. Immediately upon opening the valve, the extension 11 lifts out of contact with the disk 6, thereby providing a relatively large passage for fluid. The plug 10, however, will at first, uncover only the tapered portion 5ª of the slot. As the valve continues to open, more of the slot will be progressively uncovered. At the same time the extension 11 will offer less obstruction to the flow of the fluid into the valve. When the valve is closed, the plug 10 will move down across the slot 5 gradually closing it. The shoulder 21 between the lower end of the plug and the extension 11 is preferably undercut so that the plug will tend to have a shearing or scraping action as it moves down through the sleeve, thus removing any accumulation from the edge of the slot 5, or any accumulation that adheres to the inside of the sleeve 4.

By reason of the fact that the diameter of the outlet passage 14 does not offer any obstruction to the flow of fluid through the slot 5 at the point where the fluid emerges from the slot, its velocity is maintained. This is a desirable feature because of the fact that improved results are obtained by having the oil or fluid flow through the burner at a relatively high velocity. Because of the outwardly flared or divergent walls of the slot, the valve will not easily become clogged. Any coagulated masses or particles which will pass into the slot will not become stuck between the divergent walls thereof. Any material that can not pass into the slot can be pushed away by the movement of the plug along the slot.

In the arrangement shown in Figures 4 and 5, the construction of the valve designated generally as 25 is generally similar with the valve construction described in connection with Figures 1 to 3. The burner 26 is of a different type, and the passage 27 leading from the outlet of the valve to the burner, instead of being tapered, is of uniform diameter, but the diameter of the passage is substantially as great as the uncovered length of the slot when the valve is fully open, so that the connection in this case also permits of the discharge of the fluid into the burner without reduction in its velocity.

While I have illustrated a preferred embodiment of my invention, it will be understood that various changes and modifications may be made in the detailed construction thereof within the contemplation of my invention and under the scope of the following claims.

I claim:

1. A valve comprising a body having a valve chamber and having inlet and outlet connections, a single outlet port between the chamber and the outlet connection and directed toward the outlet connection and having the form of a narrow slot the walls of which are outwardly flared, the bottom of the slot being tapered, and a valve plug in the chamber movable along the outlet port.

2. A valve including a body having an inlet connection and an outlet connection and having a valve chamber, a sleeve fitted into the valve chamber having a slot therein opening toward the outlet connection, a disk in the body at the end of the sleeve for retaining the sleeve in the body, said disk having a central orifice therein, a valve stem in the body, a plug on the stem fitted into the sleeve, and an extension on the plug adapted to seat against said disk for closing the orifice therein when the plug covers the said slot in the sleeve.

3. The combination with a valve for fluid fuels having an inlet connection and an outlet connection and having a slot through which the fluid flows from the inlet connection to the outlet connection and means for controlling the flow of the fluid through the slot, of a burner having an intake passage connected to the outlet connection of the valve, said intake passage of the burner being directly in line with the slot and having a diameter at the point nearest the slot substantially equal to the maximum exposed length of the slot whereby the fluid can be projected from the valve into the burner without checking the velocity of the fluid.

4. The combination with a valve for fluid fuels having an inlet connection and an outlet connection and having a slot through which the fluid flows from the inlet connection to the outlet connection, and means for controlling the flow of the fluid through the slot, of a burner having an intake passage connected to the outlet connection of the valve, said intake passage of the burner being directly in line with the slot and having a diameter at the point nearest the slot substantially equal to the maximum exposed length of the slot whereby the fluid can be projected from the valve into the burner without checking the velocity of the fluid, said intake passage for the burner leading tangentially into the burner.

In testimony whereof I have hereunto set my hand.

ANDREAS BOWLAND.